April 9, 1935.                A. W. BALDWIN                1,997,329
                              DUMPING VEHICLE
                            Filed March 14, 1934
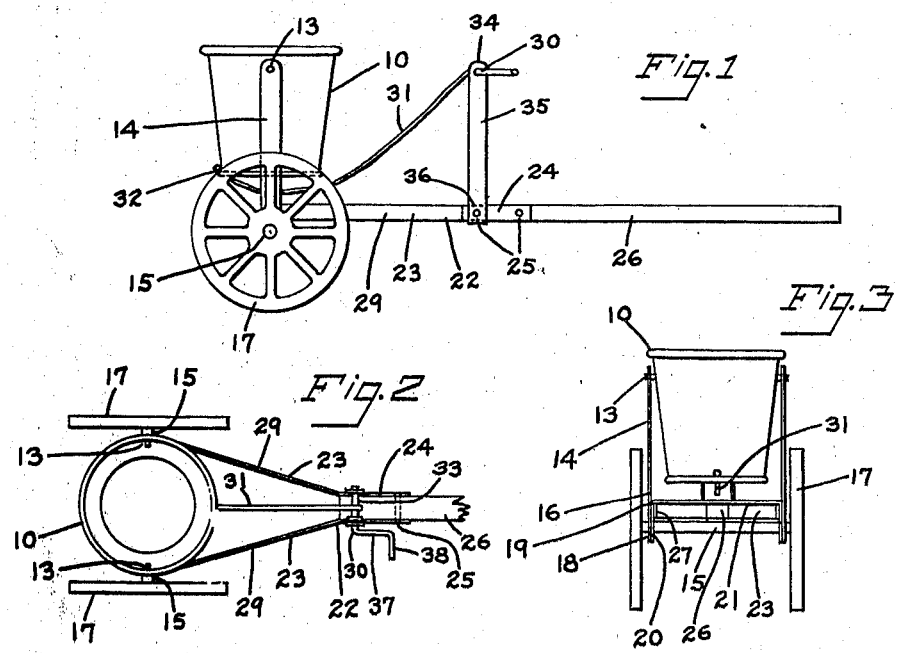
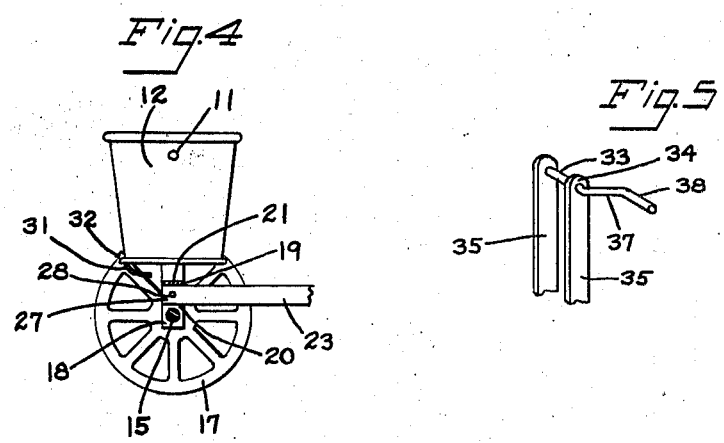
Inventor,
Amasa W. Baldwin,
By Louis M. Schmidt,
Atty.

Patented Apr. 9, 1935

1,997,329

UNITED STATES PATENT OFFICE 1,997,329

DUMPING VEHICLE

Amasa W. Baldwin, Hartford, Conn.

Application March 14, 1934, Serial No. 715,513

4 Claims. (Cl. 298—2)

My invention relates to improvements in dumping vehicle of the form comprising a pail such as is used by children playing in the sand at the seashore, and the object of my improvement is to equip such a pail, which is in the form of a vertically elongated tin pail such as is in common use, with means for permitting dumping the same of its load of sand or the like and with means for effecting such dumping in the form of a windlass.

In the accompanying drawing:—

Figure 1 is a side elevation of my improved dumping vehicle.

Fig. 2 is a plan view of the same.

Fig. 3 is an end elevation of the same.

Fig. 4 is a fragmentary view as viewed from the inside of the frame structure adjacent the axle, the latter being shown in section.

Fig. 5 is a perspective view of the windlass.

My improved dumping vehicle comprises a pail or bucket 10 in the form of a tin pail structure such as is in common use at seashore beaches but in lieu of the usual wire bail in openings 11 near the top of the side wall 12 I provide diminutive bearing supports 13 entering said openings 11. Said bearing supports 13 may be in the form of rivets secured at the upper ends of a pair of main uprights 14 that project upwardly from the axle 15 and that form parts of a frame 16. Wheels 17 are provided at the ends of the axle 15.

The uprights 14 respectively are located just inside the wheels 17 and their lower ends 18 are perforated for admitting the axle 15.

Opposed to the inside faces of said lower ends 18 are the downwardly directed branches of a yoke 19, said branches 20 depending from the ends of a cross bar 21. Said branches 20 are likewise perforated for the axle 15.

Just above the axle 15, on each side of the vehicle, are provided the connections for a trailing part 22 that, as shown, consists of two members 23 that are connected at their rear ends 24 by means of rivets 25 with a handle 26 that may be of wood. The forward ends 27 of the members 23 are opposed to the inside faces of the depending branches 20. Thus portions of the main uprights 14, the yoke 19, and the trailing part 22 generally overlap and these are secured together by means of a rivet 28. Thus the upright 14 on each side by its lower end 18 and the opposed branch 20 of the yoke 19 are positively positioned relatively the one to the other by being connected together at two points, respectively by a rivet 28 at the upper point and by the perforations for the axle 15 at the lower point. Thus in each case a single rivet suffices to effect the positive positioning of the uprights individually relatively to the yoke.

This same single rivet on each side likewise serves to positively effect the positioning of the particular handle trailing part 22 with which it is associated, as will be noted by inspection of Fig. 4. Said yoke and trailing part are made of sheet metal and the trailing part is of such width that its upper edge is in abutment with the under face of the cross bar 21.

That is to say, the uprights, yoke, and handle trailing parts and the axle are constructed and arranged so that they are operatively secured together and positively positioned relatively one to the other by means of a single rivet on each of the two sides.

The two trailing part members 23 have the rear ends 24 relatively close together, being separated merely by the thickness of the portion of the wooden handle 26 that is therebetween.

The intermediate portions 29 of the members 23 converge from the forward ends 27 to the rear ends 24.

As described, a wheeled portable structure is provided by means of which the pail is hung from pivotal supports such as to permit of readily tilting the pail for dumping sand or water that may be loaded therein, such tilting being effected by directly engaging the pail. Otherwise, the pail with its load will be maintained in a pendant position due to the weight of the load, notwithstanding any and all movements of the structure as a whole, including rocking on the wheels as the handle is raised and lowered.

Manual means for tilting the pail may be provided in the form of a windlass 30 upon the frame connected to the pail 10 by means of an operating cable or cord 31.

The forward end of the cord 31 is connected to the pail 10 at the forward bottom edge 32 thereof and as it extends rearwardly the cord rises to a height that is sufficiently elevated to ensure the complete dumping of the pail when tilted by operating the windlass 30.

As shown in Figs. 1 and 5, the windlass 30 comprises a shaft 33 that operates in bearings at the upper ends 34 of a pair of auxiliary uprights 35. Said auxiliary uprights 35 are secured at their lower ends 36 to the general frame structure by means of one of the handle securing rivets 25.

The windlass 30 is formed completely of a single piece of wire of relatively large diameter that is bent to provide the shaft 33, crank 37, and handle 38 and which utilizes the shaft 33 as a drum for winding the cord 31 thereon.

It will be noted that the bucket or pail 10 is of vertically elongated form and that the uprights 35 that support the windlass 30 and the uprights 14 that support the bucket or pail 10 are correspondingly elongated. This arrangement permits of effecting the dumping of the bucket or pail by means of the cable or cord 31 by having the latter attached to the bucket structure, as shown, at the forward edge of the bottom 32 and at the junction of said bottom with the side wall. That is to say, it is not necessary to carry the cord up from the bottom to some relatively elevated point above the bottom.

I claim as my invention:—

1. A dumping vehicle comprising a two-wheel supported frame, uprights from said frame arranged as a front pair and a rear pair in spaced arrangement along said frame, a pail operatively supported from the upper ends of said front pair and a windlass operatively supported from the upper ends of said rear pair, and a dumping-cord extending from said windlass forwardly along the bottom of said pail and connected to the forward edge thereof, at the junction with the side wall of the pail.

2. A dumping vehicle as described in claim 1, said frame comprising a yoke that extends between the said front pair of uprights, the frame supporting means comprising an axle, said yoke and the respective uprights having overlapping portions, and said overlapping portions being operatively connected by means of a single rivet in cooperation with perforations for admitting said axle.

3. A dumping vehicle as described in claim 1, said frame comprising a yoke, a handle element, parts of said handle element, of said yoke, and of one of said uprights generally overlapping one another, and a single rivet securing said parts.

4. A dumping vehicle comprising an axle with wheels at the ends, spaced uprights mounted on said axle by means of openings in the lower ends, a pail supported by the upper ends of said uprights, a yoke having a cross-bar that extends across the space between said uprights, upwardly spaced from said axle, and having downwardly directed branches that extend alongside said uprights, a handle structure having a pair of handle elements that enter the space between said cross-bar and axle and that are respectively opposed to said branches, and means securing the respective uprights with the adjacent branches and handle elements.

AMASA W. BALDWIN.